United States Patent
Fukushima

(10) Patent No.: US 9,302,928 B2
(45) Date of Patent: Apr. 5, 2016

(54) AMORPHOUS ALLOY, MOLDING DIE, AND METHOD FOR MOLDING OPTICAL ELEMENT

(71) Applicant: CANON KABUSHIKI KAISHA, Tokyo (JP)

(72) Inventor: Hirotaka Fukushima, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 13/741,238

(22) Filed: Jan. 14, 2013

(65) Prior Publication Data

US 2013/0180284 A1 Jul. 18, 2013

(30) Foreign Application Priority Data

Jan. 17, 2012 (JP) ................................ 2012-007138

(51) Int. Cl.
| | |
|---|---|
| C22C 27/00 | (2006.01) |
| C22C 45/00 | (2006.01) |
| C03B 11/08 | (2006.01) |
| C03C 1/00 | (2006.01) |
| C03B 11/12 | (2006.01) |

(52) U.S. Cl.
CPC .............. *C03B 11/086* (2013.01); *C03B 11/122* (2013.01); *C03C 1/00* (2013.01); *C22C 45/00* (2013.01); *C03B 2215/12* (2013.01); *C03B 2215/16* (2013.01); *C03B 2215/31* (2013.01); *C03B 2215/32* (2013.01); *Y02P 40/57* (2015.11)

(58) Field of Classification Search
None
See application file for complete search history.

(56) References Cited

U.S. PATENT DOCUMENTS

| | | | | |
|---|---|---|---|---|
| 4,629,487 | A | 12/1986 | Monji | |
| 7,494,527 | B2 * | 2/2009 | Jurewicz et al. | ................. 75/346 |
| 7,503,959 | B2 * | 3/2009 | Akimoto et al. | ................. 75/351 |
| 2003/0206823 | A1 | 11/2003 | Adams | |
| 2008/0166596 | A1 * | 7/2008 | Das et al. | ....................... 428/800 |
| 2009/0023694 | A1 | 1/2009 | Schramm | |
| 2014/0053606 | A1 * | 2/2014 | Fukushima et al. | ............. 65/102 |

FOREIGN PATENT DOCUMENTS

| | | |
|---|---|---|
| CN | 1524813 A | 9/2004 |
| CN | 102180585 A | 9/2011 |
| JP | H06-144850 A | 5/1994 |
| JP | 2002-220239 A | 8/2002 |

\* cited by examiner

*Primary Examiner* — George Wyszomierski
(74) *Attorney, Agent, or Firm* — Canon U.S.A. Inc., IP Division

(57) ABSTRACT

An amorphous alloy contains 68 atomic % or more and 86 atomic % or less of Re, 8 atomic % or more and 12 atomic % or less of Hf, and 0.1 atomic % or more and 5 atomic % or less of O.

6 Claims, 2 Drawing Sheets

AMORPHOUS ALLOY, MOLDING DIE, AND METHOD FOR MOLDING OPTICAL ELEMENT

BACKGROUND OF THE INVENTION

1. Field of the Invention

The present invention relates to an amorphous alloy, a molding die including the amorphous alloy and used in a method for producing camera lenses and the like, and a method for molding an optical element using the molding die.

2. Description of the Related Art

The present invention relates to a molding die used for producing optical elements such as a lens, a prism, and the like by press-molding glass materials.

A press-molding technique for glass materials without the need for a grinding and polishing process is a simple production process capable of simply producing lenses at low cost. Therefore, the press-molding technique has recently been being used for producing not only lenses but also prisms and other optical elements in general.

Examples of properties required for mold materials used for producing such glass optical elements by press-molding include excellent heat resistance, chemical stability, hardness, releasability, workability, etc.

In addition, there have been many proposals of molding dies. For example, U.S. Pat. No. 4,629,487 proposes a molding die produced by processing cemented carbide having excellent heat resistance, oxidation resistance, and hardness into a desired shape and then coating a surface with a noble metal having chemical stability and high releasability from glass materials to form a release film.

However, in order to realize a variety of optical designs, various glass materials have recently been being used for glass elements. Some of the glass materials contain high-reactivity components such as phosphoric acid, hydrofluoric acid, and the like, and release films for molding dies with higher releasability are required for stably molding such glass. Therefore, US Patent Laid-Open No. 2009/23694 proposes a glass molding die using an amorphous alloy, the mold being capable of achieving chemical stability and high releasability.

However, a release film of the molding die described in US Patent Laid-Open No. 2009/23694 is chemically stable but has low hardness because it includes a cut layer. In addition, a PtHfZrNi amorphous alloy described in US Patent Laid-Open No. 2009/23694 has a value of hardness of 12 GPa measured with a nano-indenter manufactured by Agilent Technologies, Inc.

During glass molding, dust rises from a sliding portion of a molding die or apparatus. Carbide used as a mold material has a hardness of about 13 GPa to 18 GPa. In contrast, when a coating used for a molding die has a hardness of about 12 GPa as described above, such carbide dust is often caught by the mold during molding, thereby damaging the coating. When a glass optical element is molded with such a damaged molding die, damage of the molding die is also transferred to the glass optical element, causing defects in the appearance of the glass optical element.

SUMMARY OF THE INVENTION

The present invention provides an amorphous alloy having chemical stability, good releasability, and high hardness, and provides a molding die using the alloy, which is little damaged during molding. The present invention also provides a method for molding an optical element using the molding die.

The present invention provides an amorphous alloy containing 68 atomic % or more and 86 atomic % or less of Re, 8 atomic % or more and 12 atomic % or less of Hf, and 0.1 atomic % or more and 5 atomic % or less of O.

The present invention also provides a molding die including a release film of an amorphous alloy formed on a surface thereof, wherein the amorphous alloy contains 68 atomic % or more and 86 atomic % or less of Re, 8 atomic % or more and 12 atomic % or less of Hf, and 0.1 atomic % or more and 5 atomic % or less of O.

The present invention further provides a method for molding an optical element, the method including a step of placing a glass preform in a molding die, and a step of press-molding the glass preform, wherein the molding die includes a release film of an amorphous alloy formed on a surface thereof, and the amorphous alloy contains 68 atomic % or more and 86 atomic % or less of Re, 8 atomic % or more and 12 atomic % or less of Hf, and 0.1 atomic % or more and 5 atomic % or less of O.

According to the present invention, it is possible to provide an amorphous alloy having chemical stability, good releasability, and high hardness, and a molding die using the alloy, which is little damaged during molding. Also, a method for molding an optical element using the molding die can be provided.

Further features of the present invention will become apparent from the following description of exemplary embodiments with reference to the attached drawings.

DESCRIPTION OF THE EMBODIMENTS

Embodiments of the present invention are described in detail below.

An amorphous alloy according to an embodiment of the present invention is provided for resolving the problem that an alloy for a glass molding die using a usual amorphous alloy has low hardness, and a molding die and a glass element molded using the die are easily damaged.

An amorphous alloy according to the embodiment of the present invention contains 68 atomic % or more and 86 atomic % or less of Re, 8 atomic % or more and 12 atomic % or less of Hf, and 0.1 atomic % or more and 5 atomic % or less of O.

By using the amorphous alloy according to the embodiment, it is possible to produce a glass molding die which has chemical stability and high releasability because the amorphous alloy is chemically stable and which is little damaged during molding because of its high hardness.

An embodiment of the present invention is described in detail below with reference to the drawings.

Figure 1:
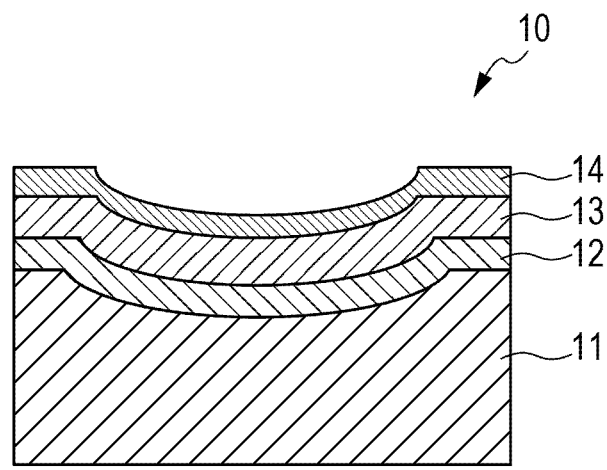
FIG. 1 is a schematic drawing illustrating a molding die according to an embodiment of the present invention.

FIG. 1 is a schematic drawing illustrating a molding die according to an embodiment of the present invention. In FIG. 1, a molding die 10 according to the embodiment includes a carbide substrate 11 composed of carbide J05 (Fuji Die Co., Ltd.) which is a sintered material of tungsten carbide, a Ti layer 12 laminated on the carbide substrate 11, a TiN layer 13 laminated on the Ti layer 12, and a release film 14 laminated on the TiN layer 13. The release film 14 is composed of the amorphous alloy having a Re—Hf—O or Re—Hf—Ir—O composition according to the embodiment of the present invention.

The Ti layer 12, the TiN layer 13, and the release film 14 are sequentially laminated on the carbide substrate 11 by a physical vapor deposition method such as a sputtering method or the like. A desired alloy composition ratio of the release film 14 can be realized by the sputtering method using a target having a desired composition ratio or by a multi-target sputtering method using a sputtering apparatus 20 which includes a plurality of targets as shown in FIG. 2.

Figure 2:
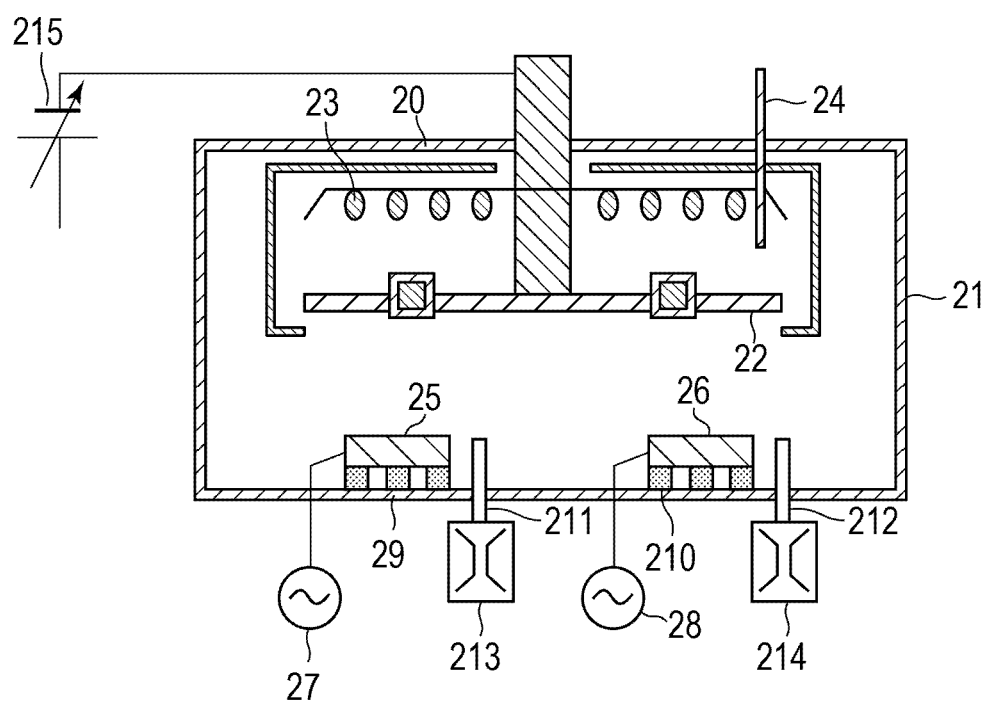
FIG. 2 is an explanatory view illustrating a sputtering apparatus used for amorphous alloy coating according to an embodiment of the present invention.

FIG. 2 is an explanatory view showing a sputtering apparatus for amorphous alloy coating according to the embodiment. A process for depositing the release film 14 is described below with reference to FIG. 2. The sputtering apparatus 20 includes a vacuum chamber 21, a substrate holder 22 disposed in the vacuum chamber 21, a halogen lamp heater 23, a thermocouple thermometer 24, a Re sputtering target 25, a Hf sputtering target 26, an Ir sputtering target (not shown), a RF power supply 27 for the Re sputtering target 25, a RF power supply 28 for the Hf sputtering target 26, a RF power supply (not shown) for the Ir sputtering target, a magnet 29 for the Re sputtering target 25, a magnet 210 for the Hf sputtering target 26, a magnet (not shown) for the Ir sputtering target, an Ar gas supply line 211 for the Re sputtering target 25, an Ar gas supply line 212 for the Hf sputtering target 26, an Ar gas supply line (not shown) for the Ir sputtering target, a mass flow controller 213 for the Re sputtering target 25, a mass flow controller 214 for the Hf sputtering target 26, a mass flow controller (not shown) for the Ir sputtering target, a DC bias power supply 215 for the substrate holder 22, and an exhaust system (not shown) arranged to appropriately evacuate the chamber 21.

After the Ti layer 12 and the TiN layer 13 are laminated in order on the carbide substrate 11 processed into a desired shape, the substrate 11 is mounted on the substrate holder 22, and the vacuum chamber 21 is exhausted. The carbide substrate 11 is heated to 600° C. using the halogen lamp heater 23 and the thermocouple thermometer 24. During film deposition, the substrate 11 is heated for enhancing adhesion of the film to the substrate 11.

A potential of −600 V is applied to the substrate holder 22 using the DC bias power supply 215. The bias potential allows positively-charged Ar ions with high energy to be drawn into the carbide substrate 11 during film deposition, and thus the adhesion of the alloy to the substrate can be enhanced.

In order to minimize intake of vacuum chamber residual gases into the film, Ar gas is introduced at about 80 sccm through the Ar gas supply lines 211, 212 using the mass flow controllers 213, 214 after a high degree of vacuum at about a lower $10^{-5}$ Pa level is attained. Then, plasma is formed on the targets 25, 26 using the RF power supplies 27, 28 and the magnets 29, 210 disposed on the rear sides of the targets 25, 26, performing three-target sputtering deposition of Re, Hf, and Ir. The composition of an alloy film can be controlled by controlling the power ratio between the RF power supplies 27, 28. In order to form a Re—Hf binary alloy, of course, no power may be supplied to the Ir target.

As a result of intensive research, the inventors succeeded in enhancing the hardness of an alloy film using high-hardness Re as a main component of the amorphous alloy according to the embodiment and in making the alloy amorphous by adding Hf which has an atomic radius greatly different from Re and negative mixing enthalpy with Re.

That is, the amorphous alloy according to the embodiment contains 68 atomic % or more and 86 atomic % or less of Re, 8 atomic % or more and 12 atomic % or less of Hf, and 0.1 atomic % or more and 5 atomic % or less of O. When the amorphous alloy contains Ir, the balance can be composed of Ir. The amorphous alloy can contain 68 atomic % or more and 76 atomic % or less of Re, 8 atomic % or more and 12 atomic % or less of Hf, 0.1 atomic % or more and 2 atomic % or less of O, and 11 atomic % or more and 18 atomic % or less of Ir.

When the amorphous alloy according to the embodiment does not contain Ir, the amorphous alloy can contain 83 atomic % or more and 86 atomic % or less of Re, 8 atomic % or more and 12 atomic % or less of Hf, and 0.1 atomic % or more and 5 atomic % or less of O. When the amorphous alloy does not contain Ir, the amorphous alloy can be composed of only Re, Hf, and O.

According to the embodiment, the amorphous alloy has the above-described composition, and thus an amorphous alloy film having high hardness equal to or higher than the carbide hardness of 18 to 20 GPa can be produced.

In addition, elements other than Re, Ir, and Hf contained the amorphous alloy film according to the embodiment include only trace amounts of impurities contained in target materials and unavoidable components resulting from particles and residual gases in the deposition vacuum chamber. Since the alloy film is formed by vacuum deposition, oxygen is inevitably taken into the film due to the residual gases such as water in the deposition vacuum chamber during film deposition. It is ideal that oxygen is absent from the film, but about 0.1 atomic % to 5 atomic % of oxygen is introduced even when an effort is made to decrease the gases adsorbed on the chamber inner wall by long-term evacuation and baking of the chamber. Even when containing the inevitable oxygen introduced during deposition, the amorphous alloy film according to the embodiment has desired amorphousness and hardness and is included in the scope of the present invention.

Elements of inevitable components other than oxygen contained in the amorphous alloy according to the embodiment include Fe. In addition, the content of inevitable components other than oxygen contained in the amorphous alloy according to the embodiment is 0.03 atomic % or less relative to the total of the amorphous alloy.

Figure 3:
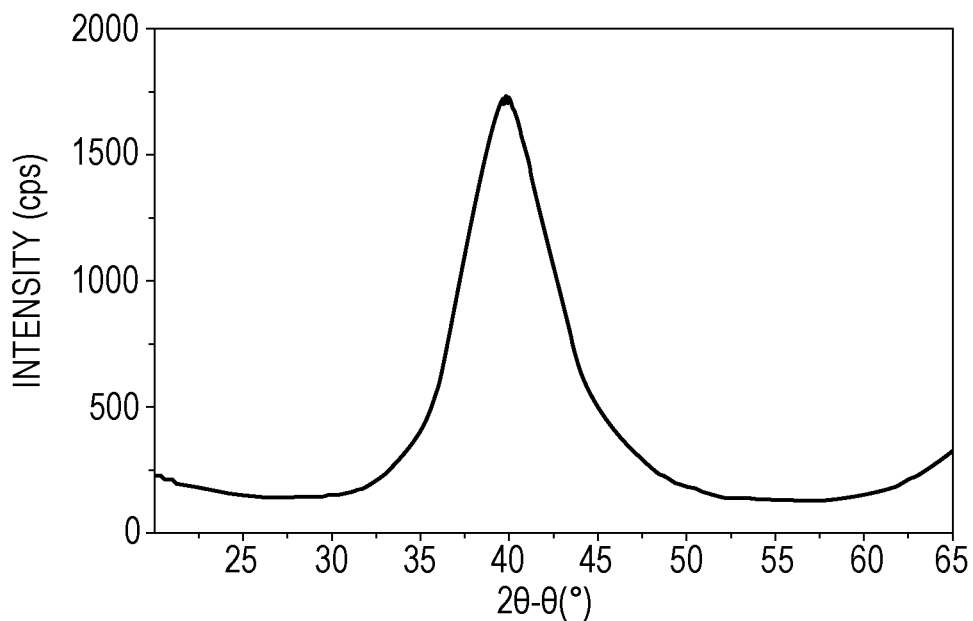
FIG. 3 is an X-ray diffraction diagram of an amorphous alloy according to an embodiment of the present invention.

FIG. 3 is an X-ray diffraction diagram of an amorphous alloy having a Re69-Hf11-Ir18-O2 (atomic %) composition. This was measured by a θ-2θ method using Phillips X'pert. The alloy is found to be amorphous.

A method for molding an optical element according to an embodiment of the present invention includes a step of placing a glass preform in the molding die described above, and a step of press-molding the glass preform.

Figure 4:
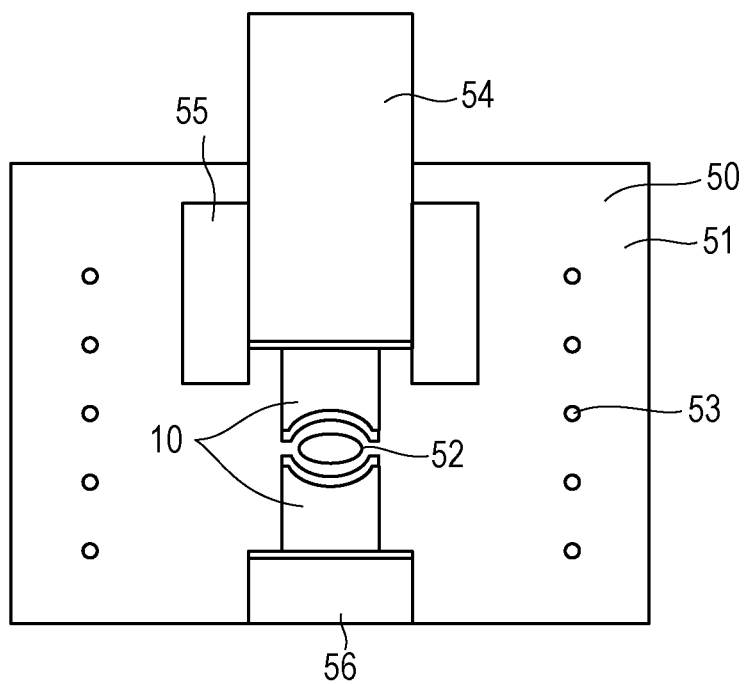
FIG. 4 is a schematic drawing illustrating a molding machine used for a method for molding an optical element according to an embodiment of the present invention.

FIG. 4 is a schematic drawing of a molding machine used in the method for molding an optical element according to the embodiment. The method for molding an optical element is described with reference to FIG. 4. A molding machine 50 includes a chamber 51, a molding die 10 having a surface coated with the amorphous alloy according to the embodiment of the present invention, a glass preform 52 to be molded, a heater 53, a shaft 54 used for pressing an upper die, a drum mold 55 which determines an axial position during pressing the upper die, and a support base 56 which supports a lower die and applies pressure.

The inside of the chamber 51 is purged with nitrogen, and then the glass preform 52, the molding die 10, and the drum mold 55 are heated to a desired temperature using the heater 53. Then, the glass preform 52 is press-molded by the upper and lower molding dies 10 using the shaft 54 and the support base 56. The glass preform 52 is composed of glass containing phosphate, glass containing fluoride, or glass containing Ti oxide, W oxide, and Bi oxide.

The repetition of molding raises dust of carbide powder from a sliding portion because the upper die slides on the drum mold. Although the carbide powder may be mixed during pressing of glass, the release film of the molding die 10 is not damaged because the release film has higher hardness than that of carbide powder. Therefore, a defective appearance of the glass molded product can be prevented from occurring due to the damage to the molding die.

In addition, since a surface in contact with glass has the chemically stable amorphous alloy film which is formed thereon and includes a stable passive film with no crystal grain boundary, fusion of glass to the mold 10 little occurs. In particular, in molding glass having high reactivity and containing phosphoric acid, hydrofluoric acid, or easily reducible components Ti, W, and B, the chemical stability of the amorphous alloy film particularly has an effect as compared with a crystal release film.

Further, releasability can be further improved by coating the glass preform with DLC (diamond like carbon) or the like. In this case, the preform can be released at a high temperature after molding, and thus the tact time can be shortened, leading to expectation of improvement in productivity. In this case, since the amorphous alloy on the surface of the mold has higher hardness than that of the DLC film coating formed on the glass preform and having a hardness of ten-odd GPa, damage to the mold due to contact with DLC on the glass preform can be suppressed during molding.

The amorphous alloy and the molding die using the alloy according to the embodiment are chemically stable, have good releasability and high hardness, and are little damaged during molding, and thus can be used for molding optical elements such as a lens, a prism, and the like.

Examples

Alloy films formed by the film deposition process using the sputtering apparatus according to the embodiment are described below in examples and comparative examples. The present invention is not limited to the film deposition process and the comparative examples are also described for indicating the effect of the present invention.

Example 1

An amorphous alloy film and a molding die using the same according to the present invention are described below as an example.

As raw materials for an amorphous alloy, a Re target material having a diameter of 76.2 mm (3 inches) and a purity of 99.9%, a Hf target material having a diameter of 76.2 mm (3 inches) and a purity of 99.9%, and an Ir target material having a diameter of 76.2 mm (3 inches) and a purity of 99.9% were used for Re, Hf, and Ir, respectively. The amorphous alloy film was formed by a RF sputtering film deposition process using the sputtering apparatus.

In Example 1, a molding die included, as an upper die, a carbide J05 die processed to a convex shape having an outer dimension of 18 mm and a curvature radius of 22 mm by grinding/polishing, the upper die having a Ti layer and a TiN layer laminated to a total thickness of 1 μm on a surface thereof. In addition, a release film was formed on the upper die by depositing, to a thickness of 200 nm, an amorphous alloy containing 69 atomic % of Re, 11 atomic % of Hf, 18 atomic % of Ir, and 2 atomic % of O (measured by an XPS (X-ray photoelectron spectroscopy) apparatus, PHI Quantera SXM, manufactured by ULVAC-PHI Inc.). A lower die was a carbide J05 die processed to a concave shape having an outer dimension of 18 mm and a curvature radius of 22 mm by grinding/polishing, the lower die having a Ti layer and a TiN layer laminated to a total thickness of 1 μm on a surface thereof. In addition, a release film was formed on the lower die by depositing, to a thickness of 200 nm, an amorphous alloy containing 69 atomic % of Re, 11 atomic % of Hf, 18 atomic % of Ir, and 2 atomic % of O (measured by an XPS apparatus, PHI Quantera SXM, manufactured by ULVAC-PHI Inc.). The hardness of the amorphous alloy film was 19 GPa or more (measured with a nano-indenter of Agilent Technologies, Inc.). As a result of X-ray diffraction, the alloy was found to be amorphous (measured by a θ-2θ method using Phillips X'pert).

A phosphate-based glass preform was molded by using the die, the glass containing 21.1 wt % $P_2O_5$, 10.7 wt % $WO_3$, 28.7 wt % $Bi_2O_3$, 3.49 wt % $Na_2O$, 1.07 wt % $K_2O$, 0.50 wt % $B_2O_3$, 2.51 wt % $Li_2O$, 3.13 wt % $TiO_2$, and 27.4 wt % $Nb_2O_5$ (components at less than 1% are regarded as impurities and not described) according to ICP-AES (inductively coupled plasma-atomic emission spectroscopy) analysis. The temperature during molding was 540° C. Even by molding, problems such as damage to the film and fusion of glass were not observed. Also, the problem of appearance defects such as flaws did not occur in the molded glass.

As described above, glass which is difficult to mold and which contains high-reactivity phosphate, W oxide, and Bi oxide can be molded by using the molding die of the present invention.

Example 2

In Example 2, a molding die included, as an upper die, a carbide J05 die processed to a convex shape having an outer dimension of 18 mm and a curvature radius of 22 mm by grinding/polishing, the upper die having a Ti layer and a TiN layer laminated to a total thickness of 1 μm by a RF sputtering method on a surface thereof. In addition, a release film was formed on the upper die by depositing, to a thickness of 250 nm, an amorphous alloy containing 76 atomic % of Re, 9 atomic % of Hf, 11 atomic % of Ir, and 4 atomic % of O (measured by an XPS apparatus, PHI Quantera SXM, manufactured by ULVAC-PHI Inc.). A lower die was a carbide J05 die processed to a concave shape having an outer dimension of 18 mm and a curvature radius of 22 mm by grinding/polishing, the lower die having a Ti layer and a TiN layer laminated to a total thickness of 1 μm on a surface thereof. In addition, a release film was formed on the lower die by depositing, to a thickness of 200 nm, an amorphous alloy containing 76 atomic % of Re, 9 atomic % of Hf, 11 atomic % of Ir, and 4 atomic % of O (measured by an XPS apparatus, PHI Quantera SXM, manufactured by ULVAC-PHI Inc.).

The hardness of the amorphous alloy film was 19 GPa (measured with a nano-indenter of Agilent Technologies, Inc.). As a result of X-ray diffraction, the alloy was found to be amorphous (measured by a θ-2θ method using Phillips X'pert).

A phosphate-based glass preform was molded by using the die, the glass containing 39.6 wt % $Nb_2O_5$, 19.7 wt % $P_2O_5$, 14.0 wt % $WO_3$, 13.6 wt % $Bi_2O_3$, 5.44 wt % $GeO_2$, 2.43 wt % $Na_2O$, 2.75 wt % $K_2O$, and 2.56 wt % $Li_2O$ according to ICP-AES analysis. The temperature during molding was 550° C. Even by molding, problems such as damage to the film and fusion of glass were not observed. Also, the problem of appearance defects such as flaws did not occur in the molded glass.

As described above, glass which is difficult to mold and which contains high-reactivity phosphate, W oxide, and Bi oxide can be molded by using the molding die of the present invention.

Further, a glass preform was molded by using the die, the glass containing 40.2 wt % $SiO_2$, 29.7 wt % $TiO_2$, 14.3 wt % $Na_2O$, 9.20 wt % $K_2O$, 4.30 wt % BaO, and 1.95 wt % $Li_2O$ according to ICP-AES analysis. The temperature during molding was 560° C. Even by molding, problems such as damage to the film and fusion of glass were not observed. Also, the problem of appearance defects such as flaws did not occur in the molded glass.

As described above, glass which is difficult to mold and which contains highly-reducible Ti oxide can be molded by using the molding die of the present invention.

Example 3

In Example 3, a molding die included, as an upper die, a carbide J05 die processed to a convex shape having an outer dimension of 18 mm and a curvature radius of 22 mm by grinding/polishing, the upper die having a Ti layer and a TiN layer laminated to a total thickness of 1 μm on a surface thereof. In addition, a release film was formed on the upper die by depositing, to a thickness of 200 nm, an amorphous alloy containing 75 atomic % of Re, 8 atomic % of Hf, 12 atomic % of Ir, and 5 atomic % of O (measured by an XPS apparatus, PHI Quantera SXM, manufactured by ULVAC-PHI Inc.). A lower die was a carbide J05 (Fuji Die Co., Ltd.) die processed to a concave shape having an outer dimension of 18 mm and a curvature radius of 22 mm by grinding/polishing, the lower die having a Ti layer and a TiN layer laminated to a total thickness of 1 μm on a surface. In addition, a release film was formed on the lower die by depositing, to a thickness of 200 nm, an amorphous alloy containing 75 atomic % of Re, 8 atomic % of Hf, 12 atomic % of Ir, and 5 atomic % of O (measured by an XPS apparatus, PHI Quantera SXM, manufactured by ULVAC-PHI Inc.).

The hardness of the amorphous alloy film was 18 GPa (measured with a nano-indenter of Agilent Technologies, Inc.). As a result of X-ray diffraction, the alloy was found to be amorphous (measured by a θ-2θ method using Phillips X'pert).

A hydrofluoric acid-containing glass preform was molded by using the die, the glass containing 54.5 wt % $SiO_2$, 17.9 wt % $Ba_2O_3$, 18.4 wt % $K_2O$, 8.7 wt % $F_2$, 0.3 wt % $Al_2O_3$, and 0.2 wt % $Sb_2O_3$ according to ICP-AES analysis. The temperature during molding was 540° C. Even by molding, problems such as damage to the film and fusion of glass were not observed. Also, the problem of appearance defects such as flaws did not occur in the molded glass.

As described above, hydrofluoric acid-based glass which is difficult to mold and which has high reactivity can be molded by using the molding die of the present invention.

Examples 4 to 7

Like in Examples 1 to 3, amorphous alloy films with a hardness of 18 GPa or more were formed by using an amorphous alloy containing 68 atomic % or more and 86 atomic % or less of Re, 8 atomic % or more and 12 atomic % or less of Hf, 0.1 atomic % or more and 5 atomic % or less of O, and the balance composed of Ir, or an amorphous alloy containing 83 atomic % or more and 91.9 atomic % or less of Re, 8 atomic % or more and 12 atomic % or less of Hf, and 0.1 atomic % or more and 5 atomic % or less of O as shown in Table 1.

The composition was measured by an XPS apparatus, PHI Quantera SXM, manufactured by ULVAC-PHI Inc., hardness was measured with a nano-indenter of Agilent Technologies, Inc., and crystallinity was measured by a θ-2θ method using Phillips X'pert. It can be considered that because of high hardness and amorphousness, dies laminated with the alloys of Examples 4 to 7 have the same glass molding performance as in Examples 1 to 3.

The results of Examples 1 to 7 are summarized in Table 1.

TABLE 1

| | Composition (atomic %) | | | | Hardness | |
|---|---|---|---|---|---|---|
| | Re | Hf | Ir | O | (GPa) | Crystallinity |
| Example 1 | 69 | 11 | 18 | 2 | 19 | Amorphous |
| Example 2 | 76 | 9 | 11 | 4 | 19 | Amorphous |
| Example 3 | 75 | 8 | 12 | 5 | 18 | Amorphous |
| Example 4 | 68 | 12 | 15 | 5 | 18 | Amorphous |
| Example 5 | 86 | 9 | 0 | 5 | 20 | Amorphous |
| Example 6 | 68 | 11 | 16 | 5 | 18 | Amorphous |
| Example 7 | 83 | 12 | 0 | 5 | 18 | Amorphous |

Comparative Examples 1 to 11

In order to show the advantages of the present invention, the results of Comparative Examples 1 to 11 using a Re—Hf—O—Ir composition or Re—Hf—O composition out of the composition of the present invention are shown in Table 2. The composition was measured by an XPS apparatus, PHI Quantera SXM, manufactured by ULVAC-PHI Inc., hardness was measured with a nano-indenter of Agilent Technologies, Inc., and crystallinity was measured by a θ-2θ method using Phillips X'pert. It is found that in the comparative examples, the alloys are crystallized or become unsatisfactory in hardness. Although amorphous alloys have chemical stability, crystallized alloys lose chemical stability.

TABLE 2

| | Composition (atomic %) | | | | Hardness | |
|---|---|---|---|---|---|---|
| | Re | Hf | Ir | O | (GPa) | Crystallinity |
| Comparative Example 1 | 68 | 17 | 10 | 5 | 17 | Amorphous |
| Comparative Example 2 | 55 | 15 | 26 | 4 | 16 | Amorphous |
| Comparative Example 3 | 58 | 10 | 27 | 5 | 17 | Amorphous |
| Comparative Example 4 | 71 | 7 | 17 | 5 | 18 | Crystal |
| Comparative Example 5 | 50 | 10 | 35 | 5 | 17 | Amorphous |
| Comparative Example 6 | 0 | 16 | 80 | 4 | 18 | Crystal |
| Comparative Example 7 | 58 | 10 | 27 | 5 | 16 | Amorphous |
| Comparative Example 8 | 48 | 0 | 48 | 4 | 20 | Crystal |
| Comparative Example 9 | 0 | 0 | 95 | 5 | 19 | Crystal |
| Comparative Example 10 | 95 | 0 | 0 | 5 | 28 | Crystal |
| Comparative Example 11 | 0 | 95 | 0 | 5 | 13 | Crystal |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-007138 filed Jan. 17, 2012, which is hereby incorporated by reference herein in its entirety.

What is claimed is:

1. An amorphous alloy containing:
68 atomic % or more and 86 atomic % or less of Re;
8 atomic % or more and 12 atomic % or less of Hf; and
0.1 atomic % or more and 5 atomic % or less of O.

2. The amorphous alloy according to claim 1, wherein the alloy further contains Ir.

3. The amorphous alloy according to claim 1, wherein the amorphous alloy contains only Re, Hf, and O, and an Re content is 83 atomic % or more and 86 atomic % or less.

4. A molding die comprising a release film of an amorphous alloy formed on a surface thereof,
wherein the release film of an amorphous alloy contains 68 atomic % or more and 86 atomic % or less of Re, 8 atomic % or more and 12 atomic % or less of Hf, and 0.1 atomic % or more and 5 atomic % or less of O.

5. A method for producing an optical element comprising:
a step of placing a glass preform in a molding die; and
a step of press-molding the glass preform,
wherein the molding die includes a release film of an amorphous alloy formed on a surface thereof, and
the release film of an amorphous alloy contains 68 atomic % or more and 86 atomic % or less of Re, 8 atomic % or more and 12 atomic % or less of Hf, and 0.1 atomic % or more and 5 atomic % or less of O.

6. The method according to claim 5,
wherein the glass preform is composed of i) a glass containing a phosphate, ii) a glass containing a fluoride, or iii) a glass containing a Ti oxide, a W oxide, and a Bi oxide.

* * * * *